(12) United States Patent
Wernli

(10) Patent No.: US 9,296,443 B2
(45) Date of Patent: *Mar. 29, 2016

(54) THREE-WHEELED REAR-STEERING SCOOTER

(71) Applicant: SBYKE USA LLC, Las Vegas, NV (US)

(72) Inventor: Bradley E. Wernli, Oceanside, CA (US)

(73) Assignee: SBYKE USA LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,735

(22) Filed: Mar. 12, 2015

(65) Prior Publication Data
US 2015/0183483 A1  Jul. 2, 2015

Related U.S. Application Data

(63) Continuation of application No. 14/072,449, filed on Nov. 5, 2013, now Pat. No. 8,998,226, which is a continuation of application No. 13/633,242, filed on Oct. 2, 2012, now Pat. No. 8,827,296, which is a
(Continued)

(51) Int. Cl.
B62K 1/00 (2006.01)
B62K 5/08 (2006.01)
(Continued)

(52) U.S. Cl.
CPC . *B62K 5/08* (2013.01); *B62K 3/002* (2013.01); *B62K 5/02* (2013.01)

(58) Field of Classification Search
CPC .................................. B62K 5/08; B62K 3/002
USPC ..................... 280/87.043, 221, 282
See application file for complete search history.

(56) References Cited

U.S. PATENT DOCUMENTS 322,504 A   7/1885   Thompson
329,556 A  11/1885   Hirt
329,557 A  11/1885   Hirt
(Continued)

FOREIGN PATENT DOCUMENTS

AU       610642       5/1991
CN     2501789 Y     7/2002
(Continued)

OTHER PUBLICATIONS

Triton, Triton Pro, Asa Products. Asa Products, Inc. Copyright 2004. 2 pages. <http://www.asaproducts.com/PhotoGallery.asp?ProductCode=Tri%2D001+Red>.
(Continued)

*Primary Examiner* — Hau Phan
(74) *Attorney, Agent, or Firm* — Stetina Brunda Garred & Brucker

(57) ABSTRACT

A three wheeled scooter comprises a chassis having forward and aft ends with a front wheel non-pivotally mounted to the forward end and a pair of rear wheels coaxially mounted to the aft end. The chassis defines a longitudinal axis and includes a support assembly and a handle assembly extending upwardly from the support assembly. The rear wheels are configured to be angularly yawable relative to the longitudinal axis between a neutral position and a yawed position. Steering of the scooter is thereby effectuated by angular yawing of the rear wheels relative to the longitudinal axis such as by asymmetric loading of one of opposing sides of the support assembly.

19 Claims, 4 Drawing Sheets

Related U.S. Application Data continuation of application No. 12/397,145, filed on Mar. 3, 2009, now Pat. No. 8,336,894, which is a continuation of application No. 11/713,947, filed on Mar. 5, 2007, now Pat. No. 7,540,517.

(51) Int. Cl.
*B62K 3/00* (2006.01)
*B62K 5/02* (2013.01)

(56) References Cited

U.S. PATENT DOCUMENTS

| | | | |
|---|---|---|---|
| 537,689 | A | 4/1895 | Kouns |
| 638,963 | A | 12/1899 | Ganswindt |
| 865,441 | A | 9/1907 | Slocum |
| 1,213,454 | A | 1/1917 | Brown |
| 1,342,688 | A | 6/1920 | Millward et al. |
| 1,548,973 | A | 8/1925 | Burleigh |
| 1,599,223 | A | 9/1926 | Epps |
| 1,607,972 | A | 11/1926 | Wagner |
| 2,330,147 | A | 9/1943 | Rodriguez |
| 3,203,706 | A | 8/1965 | Boyden |
| D206,334 | S | 11/1966 | Ryan |
| 3,284,096 | A | 11/1966 | Hansen et al. |
| 3,392,991 | A | 7/1968 | Ryan et al. |
| 3,442,528 | A | 5/1969 | Rademacher |
| 3,652,101 | A | 3/1972 | Pivonka |
| 3,860,264 | A | 1/1975 | Douglas et al. |
| 3,891,225 | A | 6/1975 | Sessa |
| 3,992,029 | A | 11/1976 | Washizawa et al. |
| 4,047,725 | A | 9/1977 | Pinchock |
| 4,061,351 | A | 12/1977 | Bangle |
| 4,082,307 | A | 4/1978 | Tait |
| 4,103,921 | A | 8/1978 | Brooks et al. |
| 4,194,752 | A | 3/1980 | Tilch |
| 4,198,072 | A | 4/1980 | Hopkins |
| 4,359,231 | A | 11/1982 | Mulcahy |
| 4,469,343 | A | 9/1984 | Weatherford |
| 4,526,390 | A | 7/1985 | Skolnik |
| 4,624,469 | A | 11/1986 | Bourne, Jr. |
| 4,657,272 | A | 4/1987 | Davenport |
| D289,985 | S | 5/1987 | Davenport |
| D295,428 | S | 4/1988 | Cummings |
| D295,989 | S | 5/1988 | Cummings |
| D300,756 | S | 4/1989 | Cummings |
| 4,863,182 | A | 9/1989 | Chem |
| 5,046,747 | A | 9/1991 | Nielsen, Jr. |
| 5,127,488 | A | 7/1992 | Shanahan |
| 5,551,717 | A | 9/1996 | De Courcey |
| 5,620,189 | A | 4/1997 | Hinderhofer |
| 5,853,182 | A | 12/1998 | Finkle |
| 5,931,738 | A | 8/1999 | Robb |
| 6,220,612 | B1 | 4/2001 | Beleski, Jr. |
| D444,184 | S | 6/2001 | Kettler |
| 6,250,656 | B1 | 6/2001 | Ibarra |
| 6,315,304 | B1 | 11/2001 | Kirkland et al. |
| 6,318,739 | B1 | 11/2001 | Fehn |
| 6,467,781 | B1 | 10/2002 | Feng |
| 6,523,837 | B2 | 2/2003 | Kirkland |
| 6,572,130 | B2 | 6/2003 | Greene et al. |
| 6,715,779 | B2 | 4/2004 | Eschenbach |
| 6,942,235 | B2 | 9/2005 | Chang |
| 7,007,957 | B1 | 3/2006 | Lee |
| 7,044,491 | B2 * | 5/2006 | Kettler ............... B62K 5/08 280/282 |
| 7,192,038 | B2 * | 3/2007 | Tsai ............... B62K 3/002 280/221 |
| 7,290,628 | B2 | 11/2007 | Kirkpatrick et al. |
| 7,306,240 | B2 | 12/2007 | Chen |
| 7,540,517 | B2 | 6/2009 | Wernli |
| 8,128,109 | B2 | 3/2012 | Chen |
| 8,141,889 | B2 | 3/2012 | Yu et al. |
| 8,336,894 | B2 | 12/2012 | Wernli |
| 8,827,296 | B2 | 9/2014 | Wernli |
| 2003/0052471 | A1 | 3/2003 | Grafton |
| 2004/0012166 | A1 | 1/2004 | Reginato |
| 2005/0139406 | A1 | 6/2005 | McLeese |
| 2006/0049595 | A1 | 3/2006 | Crigler et al. |
| 2009/0066150 | A1 | 3/2009 | O'Rourke, Sr. |

FOREIGN PATENT DOCUMENTS

| | | |
|---|---|---|
| DE | 4424297 | 1/1996 |
| FR | 2859111 | 3/2005 |
| GB | 2225990 | 6/1990 |
| JP | 6254200 | 9/1994 |
| JP | 10211313 | 8/1998 |
| JP | 2006151032 | 6/2006 |

OTHER PUBLICATIONS

Wikipedia, "Caster Angle", http://en.wikipedia.org/wiki/Caster_angle; Oct. 10, 2009; 2 pages.

Mongoose Bikeboard; "Velocite Mongoose BikeBoard 24V"; http://bikeboardusa.com/velocite_Bike_Board_24V.asp; 2007; 2 pages.

* cited by examiner

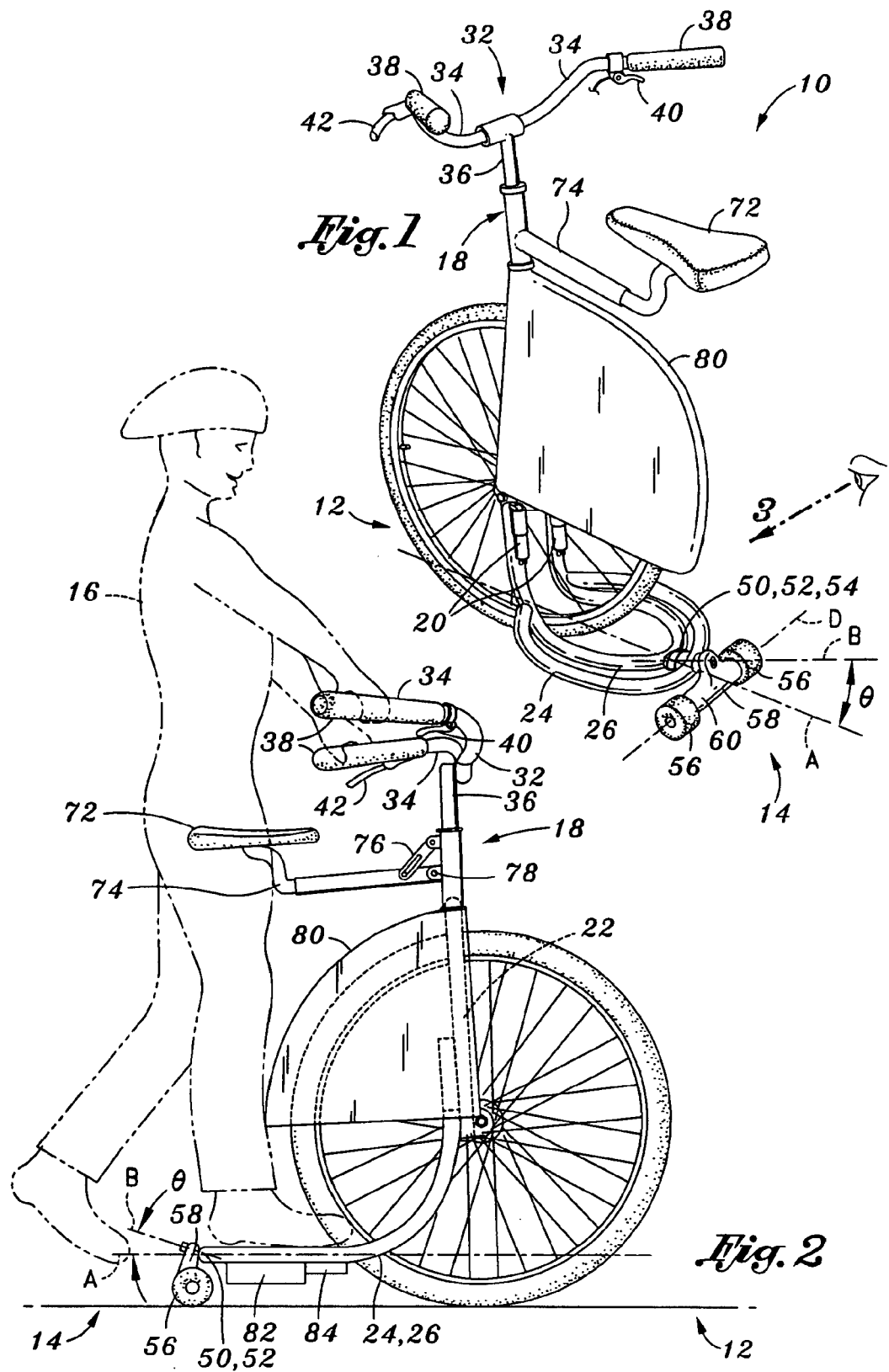

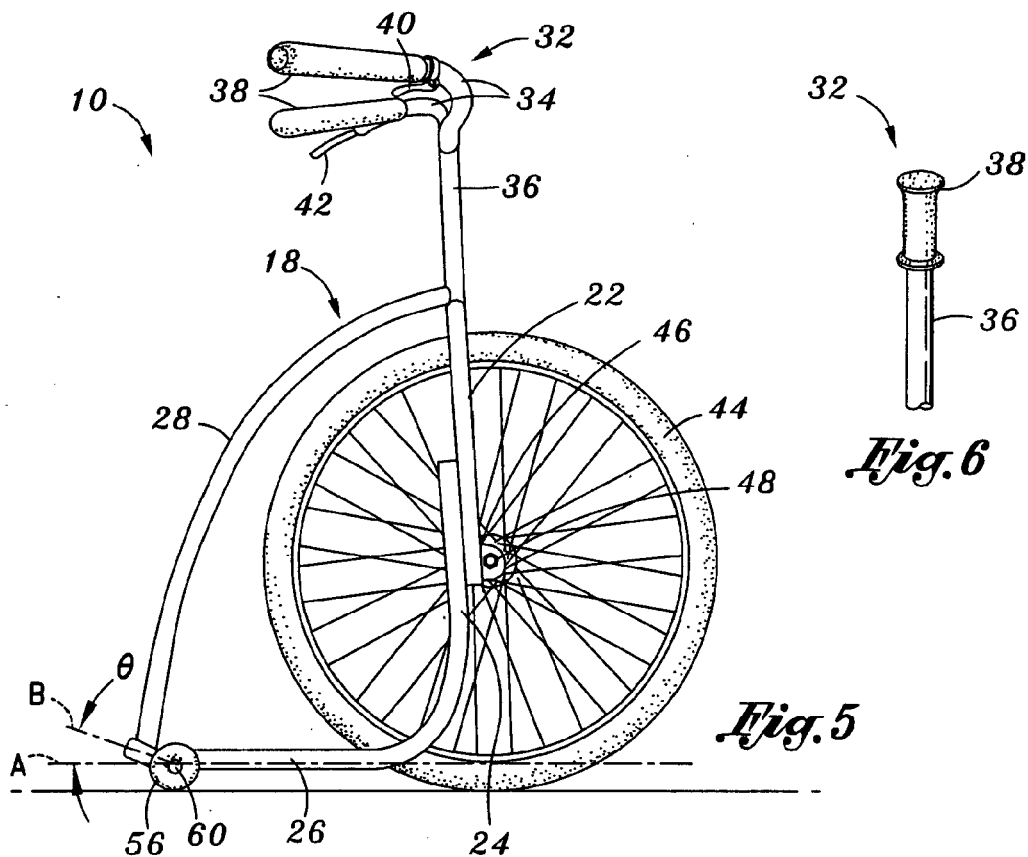
Fig. 5
Fig. 6
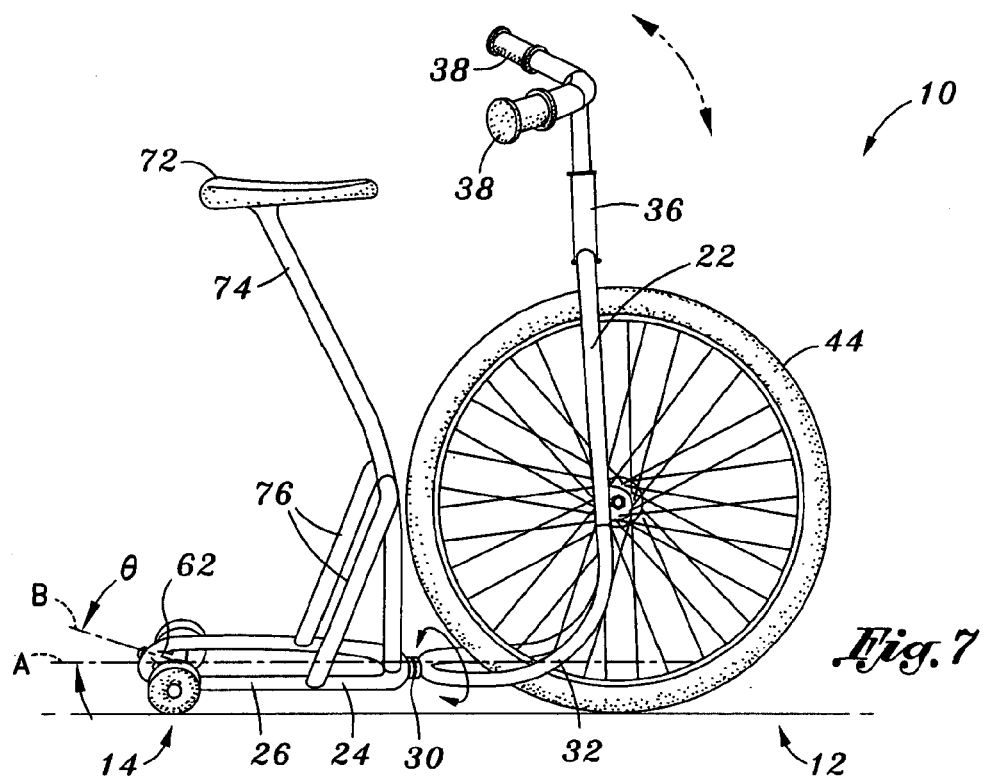
Fig. 7

THREE-WHEELED REAR-STEERING SCOOTER

CROSS-REFERENCE TO RELATED APPLICATIONS

The present application is a continuation of U.S. application Ser. No. 14/072,449 filed on Nov. 5, 2013, which is a continuation of U.S. application Ser. No. 13/633,242 filed on Oct. 2, 2012 now issued U.S. Pat. No. 8,827,296 issued Sep. 9, 2014, which is a continuation of U.S. application Ser. No. 12/397,145 filed on Mar. 3, 2009 now issued U.S. Pat. No. 8,336,894 issued Dec. 25, 2012, which is a continuation of U.S. application Ser. No. 11/713,947 filed Mar. 5, 2007 now issued U.S. Pat. No. 7,540,517 issued Jun. 2, 2009, the entire contents of which is incorporated herein by reference.

STATEMENT RE: FEDERALLY SPONSORED RESEARCH/DEVELOPMENT (Not Applicable)

BACKGROUND

The present invention relates generally to wheeled vehicles and, more particularly, to a uniquely configured three-wheeled, rear-steering scooter having a single front wheel and a pair of smaller-diameter rear wheels wherein the scooter is specifically adapted to be steered by an operator due to angular yawing of the rear wheels in response to lateral rolling or tilting of a chassis to which the rear wheels are pivotally mounted.

Scooters are well known in the prior art and are available in a wide variety of configurations with each configuration possessing certain advantages that allow a rider or operator to perform certain maneuvers that cannot be performed with other scooter configurations. For example, U.S. Pat. No. 6,250,656 issued to Ibarra discloses a scooter having an elongated footboard supported at its rear by a pair of small diameter wheels and at its front end by a large diameter front wheel. The scooter includes positive steering capability via a pivotable front wheel that is steerable by an operator via handlebar assembly. The footboard includes an upwardly angled flat portion located aft of the rear wheels and which is oriented at an angle to allow upward pitching of the scooter in response to the operator stepping on the flat portion such that the operator may perform "wheelies", and allowing the scooter to jump over objects.

U.S. Pat. No. 5,620,189 issued to Hinderhofer discloses a scooter having a frame assembly which includes a footboard at a rear of the frame assembly and a large-diameter front wheel located at a front end of the scooter. The rear of the footboard is supported by at least one unsteerable rear wheel preferably located below the footboard. Alternatively, the scooter may include a plurality of rear wheels which may be arranged in an in-line configuration which provide a plurality of rolling surfaces to facilitate gliding movement over uneven terrain such as stair steps or street curbs. Steering of the scooter is facilitated by means of a handlebar assembly by which a rider may pivot the front wheel and therefore steel the scooter in a conventional manner.

U.S. Pat. No. 6,739,606 issued to Rappaport discloses a dual-footboard scooter provided in a tricycle arrangement having a front wheel of relatively large diameter and being joined to a frame. The frame extends rearwardly in a bifurcated arrangement to form two branches, each of which is supported by a single rear wheel. Each of the branches includes a generally horizontally-oriented footboard supported at its rear end by the rear wheel. An operator may rest one foot on one of the footboards while making pushing contact with the ground in order to propel the scooter forward. Steering of the scooter is effectuated by the front wheel which is pivotable by means of a handlebar assembly for steering the scooter.

U.S. Pat. No. 6,220,612 issued to Beleski discloses a three-wheeled scooter configured as a "cambering vehicle" having a single steerable front wheel and a pair of rear wheels disposed on separate trailing arms. Each of the trailing arms is articulably to a front column from which the front wheel extends. Forward motion of the scooter is generated by the operator alternating shifting of weight from side-to-side as the scooter travels a sinusoidal path produced by the operator steering the front wheel left and right by means of a handlebar assembly. The simultaneous shifting of weight from one side to the other in combination with the steering of the vehicle produces a series of accelerations under the principle of conservation of angular momentum which results in forward motion of the scooter.

The prior art includes additional alternative scooter configurations in addition to the above described scooter arrangements. A majority of the prior art scooters facilitate directional control of the scooter by means of a pivotable front wheel which is coupled to a handlebar assembly by which the operator may steer the scooter. Furthermore, many of the scooter arrangements of the prior art are configured such that the front and rear wheels are spaced a relatively large distance from one another such that the scooter is incapable of performing short-radius turns. Even further, many of the scooter arrangements of the prior art include conventional bicycle handlebars comprising a pair of laterally outwardly extending arm members which require gripping by both of the rider's hands for effective control and steering of the scooter in a stabilized manner.

As may be appreciated, there exists a need in the art for a scooter providing an operator or rider with the capability to execute turns of varying radii including relatively short-radius turns in order to increase the range of maneuvers that may be performed. Furthermore, there exists a need in the art for a scooter that may be operated by the rider in a standing position but which eliminates the need for steering the scooter by turning a handlebar using the rider's hands.

Additionally, there exists a need in the art for a scooter which provides a means for stabilizing or balancing the rider in order to allow adults as well as children to operate the scooter without the risk of injury as a result of falling from the scooter. Finally, there exists a need in the art for a scooter which is of simple construction, low cost, reduced size and of relatively low weight in order to enhance the scooter's maneuverability and to facilitate transportation and storage of the scooter.

BRIEF SUMMARY

The present invention specifically addresses the above-described needs by providing a three-wheeled, rear-steering scooter having the capability to execute turns of varying radii including relatively short radius turns. The three-wheeled, rear-steering scooter comprises a chassis having a relatively large diameter front wheel fixedly mounted at a forward end of the chassis and a pair of smaller diameter rear wheels pivotally-mounted at an aft end of the chassis. In one embodiment, the scooter is configured to allow steering by angular yawing of the rear wheels relative to the chassis. Such angular yawing is effectuated by asymmetric loading of the chassis which causes lateral rolling of the chassis. The lateral rolling may be induced by uneven weighting of left and right sides of the chassis which, in turn, causes the rear wheels to pivot or yaw for steering control of the scooter.

In its broadest sense, the scooter comprises the chassis, the non-pivotable (i.e., non-steerable) front wheel mounted to the forward end of the chassis and an angularly-yawable pair of rear wheels mounted to the aft end of the chassis. The chassis defines a longitudinal axis extending between the forward and aft ends. The chassis may comprise a generally horizontally-oriented support assembly extending from the forward end to the aft end for supporting a rider or operator in a standing position.

Optionally, the scooter may include a handle assembly located forward of the support assembly and extending upwardly therefrom. The handle assembly may be configured as a single vertical member having a gripping potion (i.e., a hand grip) for gripping by one of the rider's hands. Alternatively, the handle assembly may be configured as a pair of lateral members each having gripping portions similar to the configuration of conventional handlebars. Regardless of its configuration, the handle assembly provides a means for stabilizing the rider or operator of the scooter.

The rear wheels are preferably disposed laterally relative to one another and, as was mentioned above, are specifically configured to be angularly yawable relative to the longitudinal axis. In this regard, the rear wheels are adapted to pivot or yaw between a neutral position and a yawed position. In the neutral position, the axis of the rear wheels oriented perpendicularly relative to the longitudinal axis. In the yawed position, the rear wheels are oriented in a non-perpendicular arrangement relative to the longitudinal axis. Direction control or steering of the scooter is effectuated solely or primarily as a result of angular yawing of the rear wheels between the neutral and yawed positions.

The support assembly is preferably configured to laterally roll about the longitudinal axis. Such lateral rolling may be effectuated by asymmetric loading of one of right and left sides of the support assembly. The asymmetric loading may be induced by the rider applying downward pressure to the left or right side of the support assembly such as by uneven weighting using the rider's feet. This asymmetric loading and lateral rolling of the support assembly induces the angular yawing motion of the rear wheels which causes the scooter to turn.

Preferably, the rear wheels are pivotally mounted to the support assembly by means of a trunnion comprising a rear axle. In one embodiment, the rear wheels are mounted on opposing ends of the axle. The trunnion is attached to the support assembly by means of a pivot shaft which extends upwardly from the rear axle. The pivot shaft interconnects the rear axle to the support assembly. Biasing members may be incorporated into the mounting of the rear axle to the support assembly. The biasing member may provide a self-steering or self-stabilizing characteristic to the rear axle, as will be described in greater detail below.

Ideally, the pivot shaft is oriented in an inclined manner relative to the longitudinal axis. More specifically, the pivot shaft may have upper and lower ends and is inclined such that the lower end is located forward of the upper end. In this manner, the pivot shaft is oriented downwardly along a direction from the aft end of the chassis toward the forward end. The downward inclination of the pivot shaft results in angular yawing of the rear wheels at the same time the support assembly rolls laterally to the right or left. The lateral rolling motion of the support assembly is in proportion to the degree of angular yawing of the rear wheel. The net effect of this combination of motions allows a rider to lean into a turn with greater yaw angles of the rear wheels corresponding to greater amounts of lateral rolling motion of the support assembly.

For example, if the rider wishes to execute a right turn of the scooter, the rider asymmetrically loads the right side of the support assembly resulting in the right side laterally rolling or pivoting downwardly about the longitudinal axis while the left side of the support assembly pivots upwardly. Simultaneously, the rear axle is caused to yaw angularly such that the rear wheel on the right side of the longitudinal axis moves forward while the rear wheel on the left side moves aft. This angular yawing causes a the scooter to be redirected toward the right (i.e., point toward the right) during forward movement of the scooter.

It is contemplated that the trunnion may be configured such that the yawing capability of the rear axle relative to the longitudinal axis is a half-angle of at least about 45°. However, the trunnion may be configured to allow yawing of the rear axle up to half-angles of lesser or greater amounts. A biasing member may optionally be included with the trunnion and is operatively connectable to the trunnion. The biasing member is preferably configured to bias the rear axis toward the neutral position in order to provide a self-steering mechanism. In this manner, the rear axle is urged back toward a non-yawed position (i.e., neutral position) following each turn.

The biasing member further provides a self-stabilizing mechanism for the scooter whereby the rear axle may better resist unwanted wobbling or oscillations in the support assembly when the scooter is traveling at high speed. Even further, the biasing member provides a self-parking feature wherein the support assembly returns to a horizontal or level orientation when the rider dismounts the scooter. The handle assembly will also return to a vertical orientation when the rider dismounts the scooter or when the scooter is stationary.

Optionally, the scooter may include an articulated joint at the forward end of the support or assembly. Alternatively, the articulated joint may be positioned so as to interconnect the support assembly to the handle assembly. Regardless of its specific location on the chassis, the articulated joint advantageously provides an alternative means for facilitating the lateral rolling motion of the support assembly. More specifically, the articulated joint allows for lateral rolling motion of the support assembly upon which the rider stands in a direction opposite that of the handle assembly. The articulated joint may provide an alternative mode of propelling the scooter forward as a result of lateral rolling the support frame out-of-phase with the handle assembly in a manner as will be described in greater detail below.

The scooter may optionally include a suspension system operatively coupled to at least one of the front and rear wheels to absorb shock that would otherwise be transmitted to the rider during travel over uneven terrain. More specifically, the suspension system is preferably configured to allow for vertical deflection of the front and/or rear wheels relative to the chassis as may be desirable when encountering gravel, cracks in pavement, or other natural or manmade obstacles.

BRIEF DESCRIPTION OF THE DRAWINGS

These as well as other features of the present invention will become more apparent upon reference to the drawings wherein:

FIG. 1 is a perspective view of a three-wheeled rear-steering scooter having a front wheel non-pivotally mounted to a forward end of the chassis assembly and a pair of rear wheels pivotally mounted to an aft end of the chassis;

FIG. 2 is a side view of the scooter of FIG. 1 illustrating a seat or perch extending laterally outwardly from the chassis assembly for supporting an operator;

FIG. 5 is a side view of the scooter in an embodiment having a strut member extending downwardly from the handle assembly;

FIG. 6 is a side view of a vertically oriented handle assembly configured for stabilizing an operator of the scooter as compared to the handlebar-like arrangement illustrated in FIGS. 1, 2 and 4; and FIG. 7 is a side view of the scooter in an alternative embodiment wherein the chassis includes an articulated joint to allow lateral rolling motion of a support assembly relative to a front wheel of the scooter.

DETAILED DESCRIPTION

Figure 2A:
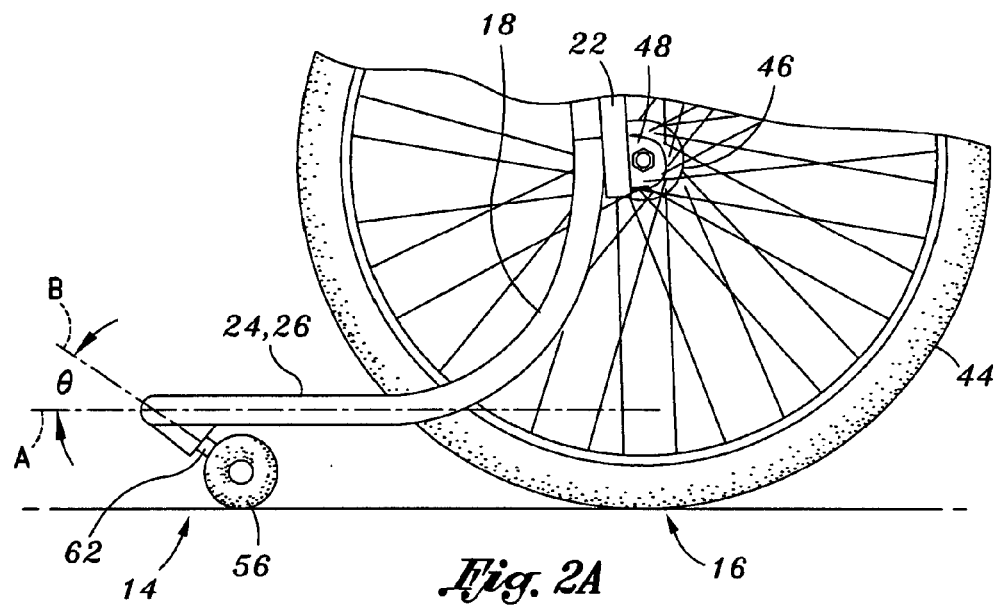
FIG. 2a is an enlarged side view of the chassis assembly illustrating an inclined orientation of an axis about which the rear wheels pivot and which facilitates angular yawing of the rear wheels for steering of the scooter.

Referring now to the drawings wherein the various showings are for purposes of illustrating preferred embodiments of the present invention and not for purposes of limiting the same, shown in the figures is a three-wheeled rear-steering scooter 10. In its broadest sense, the scooter 10 comprises a chassis 18 having a front wheel 44 and a pair of rear wheels 56 pivotally mounted to the chassis 18 so as to be angularly yawable to allow for steering of the scooter 10. As can be seen in FIGS. 1 and 2, the chassis 18 has a forward end 12 and an aft end 14 and defining a longitudinal axis A extending from the forward end 12 to the aft end 14. The chassis 18 may include a generally horizontally-oriented support assembly 24 to which the rear wheels 56 may be mounted. The support assembly 24 may comprise a foot support 26 upon which an operator 16 or rider of the scooter 10 may stand such as when riding the scooter 10.

The front wheel 44 is non-pivotally (i.e., non-steerably) mounted at the forward end 12 of the chassis 18. The chassis 18 may further include an optional handle assembly 32 which is preferably located forward of the support assembly 24 and which extends upwardly from the support assembly 24 as shown in FIGS. 1-2 and 4-7. In one embodiment, the handle assembly 32 is rigidly connected by suitable means (e.g., mechanical fasteners, welding, etc.) to the support assembly 24. However, the support assembly 24 and handle assembly 32 may be formed as a unitary structure.

Alternatively, the handle assembly 32 and support assembly 24 may be interconnected by an articulated joint 30 to allow relative lateral rolling motion therebetween, as will be described in greater detail below. The handle assembly 32 is configured to provide a means by which the rider or operator 16 may be stabilized or balanced in a standing position while riding the scooter 10. For embodiments where the support assembly 24 and handle assembly 32 are rigidly interconnected, the handle assembly 32 also provides a means for steering the scooter 10 as a result of the rider inducing lateral or sideways motion of the handle assembly 32. Because of the rigid connection between the handle assembly 32 and the support assembly 24, lateral rolling motion of the handle assembly 32 is transmitted to the support assembly 24. The resultant lateral rolling motion of the support assembly 24 induces the angular yawing motion of the rear wheels 56 by which the scooter 10 is steered, as will be described in greater detail below.

Figures 2B, 3:
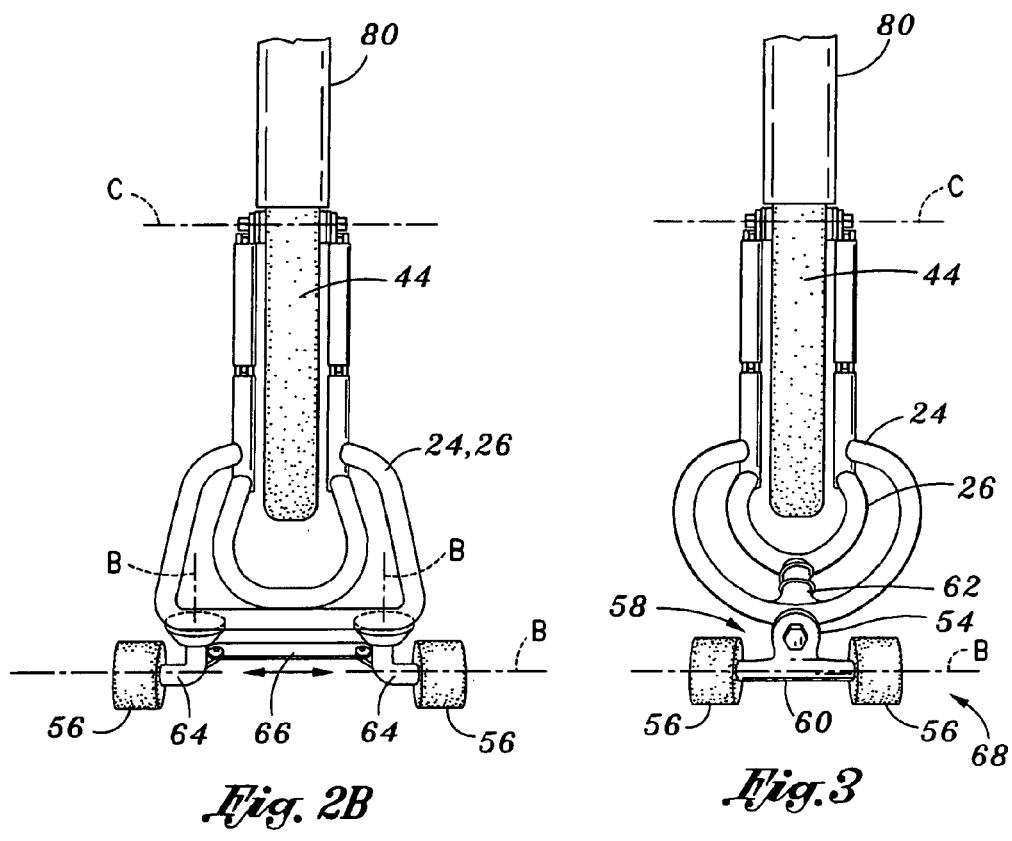
FIG. 2b is an aft view of the rear wheels and illustrating the independent pivotal mounting of each rear wheel and the coupling of the rear wheels to facilitate their angular yawing in unison.
FIG. 3 is a rear view of the scooter illustrating a trunnion comprising a rear axle and a pivot shaft interconnecting the rear axle to the chassis.

As best seen in FIGS. 1 and 2b, the rear wheels 56 are mounted on the aft end 14 of the support assembly 24 such that the rear wheels 56 are disposed laterally relative to one another. Mounting of the rear wheels 56 to the support assembly 24 may be facilitated with a trunnion 58 which may comprise a rear axle 60 having a pivot shaft 62 extending outwardly therefrom such as from a mid-point of the rear axle 60. As shown in FIGS. 1 and 3, the rear wheels 56 rotate about the rear wheel axes D and are specifically adapted to be angularly yawable relate to the longitudinal axis A between a neutral position 68 (i.e., shown in FIG. 1) and a yawed position 70 (shown in FIG. 4a). Importantly, because the front wheel 44 is fixedly secured to the chassis 18 (i.e., non-pivotably mounted), the steering of the scooter 10 is effectuated primarily or solely by angular yawing or pivoting of the rear wheels 56 relative to the longitudinal axis A.

Figure 4A:
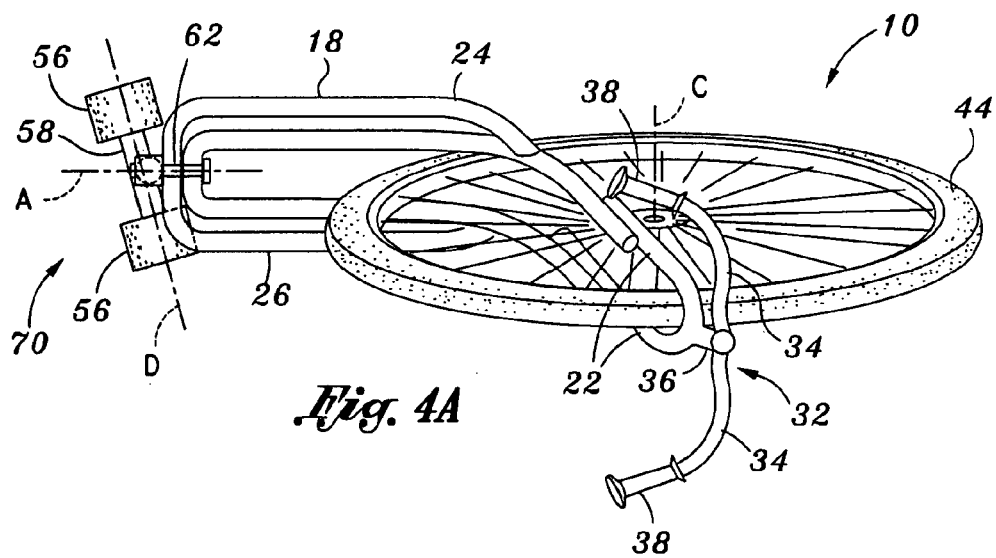
FIG. 4a is a top view of the scooter taken along line 4a of FIG. 4 and illustrating the yaw angle of the rear wheels relative to the longitudinal axis of the scooter during a turn.

As can be seen in FIG. 4a, the support assembly 24 is configured to roll laterally about the longitudinal axis A. In one embodiment of the scooter 10, the lateral rolling motion of the support assembly 24 induces the rear wheels 56 to angularly yaw which comprises the steering mechanism for the scooter 10. For example, an operator 16 may initiate a turn of the scooter 10 by asymmetrically loading one of opposing right and left sides of the support assembly 24 and, due to the orientation of the pivot axis B at pivot axis angle θ, causes the rear wheels 56 to yaw in a counterclockwise direction relative to the longitudinal axis A as best seen in FIG. 4a. More specifically, FIG. 4a illustrates the counterclockwise yawing of the rear wheels 56 relative to the longitudinal axis A as a result of weighting or loading of the right side of the support assembly 24.

Referring briefly to FIG. 2, shown is the operator 16 standing on the foot support 26 with the right leg bearing most or all of the operator's weight. This asymmetric loading on the right side of the support assembly 24 causes the lateral rolling movement which induces the angular yawing movement of the rear wheels 56 to the position shown in FIG. 4a. Alternatively, loading of the left side of the support assembly 24 would have the reverse effect of inducing clockwise yawing motion of the rear wheels 56 relative to the longitudinal axis A in order to initiate a left turn. As may be appreciated, the operator 16 may directionally control the scooter 10 during forward travel by varying the asymmetric loading on the right and left sides of the support assembly 24. The asymmetric loading may be facilitated by merely shifting the operator's weight to the left or right leg.

In one embodiment, such as that shown in FIG. 4a, the trunnion 58 upon which the rear wheels 56 are mounted is preferably adapted to provide yawing capability to the rear axle 60 relative to the longitudinal axis A at a half angle of up to about 45°. However, it should be noted that the trunnion 58 may be configured to provide any degree of angular yawing capability. As can be seen in FIGS. 1 and 3, the rear wheels 56 are preferably mounted on opposing ends of the rear axle 60.

In a preferred embodiment, the pivot shaft 62 is disposed in a non-vertical and non-horizontal orientation such that asymmetric loading of the support assembly 24 causes the angular yawing of the rear wheels 56. Even more preferably, the pivot shaft 62 is preferably oriented at pivot axis angle θ such that lateral rolling of the support assembly 24 causes the rear wheel 56 on that side to move forward while the rear wheel 56 on the opposing side moves aft. Such an arrangement allows the operator 16 to lean into the turn at progressively greater amounts in proportion to the extent of the lateral rolling motion.

Advantageously, the ability to lean into the turns allows the operator 16 to counteract the effects of centrifugal force which tend to throw the rider toward the outside of the turning radius. Although the pivot shaft 62 is preferably oriented to allow a rider to lean into the turn (i.e., facilitates movement of the rider's center of gravity toward the inside of the turn radius), it is contemplated that the pivot shaft 62 may be oriented in a variety of other arrangements. For example, the pivot shaft 62 may be oriented such that asymmetric loading of one side of the support assembly 24 results in angular yawing of the rear wheels 56 in an opposite direction.

However, as best seen in FIGS. 1, 2 and 6, the preferred arrangement is such that the pivot axis B is inclined at pivot axis angle θ relative to the longitudinal axis A such that the pivot axis B is oriented downwardly along a direction from the aft end 14 toward the forward end 12 of the chassis 18. More specifically, the pivot shaft 62 has upper and lower ends and is inclined such that the lower end of the pivot shaft 62 is located forward of the upper end of the pivot shaft 62.

As was earlier mentioned, when the support assembly 24 is laterally rolled to the left or to the right, the inclined pivot shaft 62 allows for mechanical steering of the rear wheels 56 in yaw at a direction opposite the direction of intended turning of the scooter 10. For example, if the operator 16 wishes to execute a right turn of the scooter 10, the operator 16 may asymmetrically load the right side of the support assembly 24 which causes laterally downward rolling of the support assembly 24. This laterally downward rolling of the support assembly 24 causes the rear wheels 56 to turn in an opposite direction. In this manner, the operator 16, by exerting uneven weighting of the foot support 26, induces lateral rolling thereof which, in turn, effectuates angular yawing or turning of the rear wheels 56. The greater the degree of asymmetric loading of the support assembly 24, the greater the degree of angular yawing (i.e., the smaller the turn radius).

As can be seen in the figures, the handle assembly 32 is located forward of and extends upwardly from the support assembly 24 in a generally vertical orientation. In one embodiment shown in FIG. 6, the handle assembly 32 includes a vertical arm member 36 which extends upwardly from a pair of down tubes 22 or forks to which the front wheel 44 is mounted. The vertical arm member 36 is configured to be grasped or gripped by the operator 16 for stabilizing and/or balance while riding the scooter 10. Advantageously, the handle assembly 32 also facilitates lateral rolling of the support assembly 24 due to its rigid connection thereto. In this manner, the operator 16 can initiate steering at the handle assembly 32 by a combination of asymmetric loading of the support assembly 24 and lateral rolling of the handle assembly 32 in order to effectuate quicker rates of yawing of the rear wheels 56.

Referring still to FIG. 6, the vertical arm member 36 of the handle assembly 32 may be fitted with a ergonomically shaped gripping portion 38 or a hand grip which the operator 16 may grasp. The chassis 18 may further include an arch-shaped strut member 28 extending from the handle assembly 32. The strut member 28 is preferably aligned with the front wheel 44 and is connected to the foot support 26 at its lower end. The strut member 28 may add to the overall structural rigidity, torsional stiffness and general strength of the chassis 18. The added stiffness and strength may be desirable during the performance of certain maneuvers or when operating the scooter 10 on challenging terrain.

The strut member 28 is preferably configured such that when riding the scooter 10, the operator's legs straddle the strut member 28. However, the strut member 28 may be altogether eliminated and the chassis 18 provided in the arrangement shown in FIGS. 1 and 2. In embodiments wherein the strut member 28 is omitted, the support assembly 24 and handle assembly 32 are preferably sized to collectively provide sufficient strength and rigidity to the chassis 18.

Referring to FIGS. 1, 2 and 3, the scooter 10 may further include a biasing mechanism or biasing members 54 operatively connected to the trunnion 58 and configured to bias the rear axle 60 toward the neutral position 68. As was earlier mentioned, when the rear axle 60 is in the neutral position 68, the rear axle 60 is oriented generally perpendicularly relative to the longitudinal axis A of the chassis 18. If included, the biasing members 54 preferably induces a return of the rear wheels 56 from a yawed position 70 as shown in FIG. 4a to the non-yawed or neutral position 68 as shown in FIG. 1. In this regard, the biasing members 54 resists the lateral rolling or tilt of the support assembly 24 and induces a return of the support assembly 24 to a non-rolled position which provides a desirable stabilizing characteristic to the scooter 10.

Additionally, the biasing members 54 is preferably configured to provide a progressively higher degree of stiffness or biasing force at progressively greater yaw angles of the rear wheels 56. The progressively higher stiffness of the biasing members 54 also prevents the support platform from laterally oscillating or wobbling (i.e., from side-to-side) which is important when traveling at high speed. A further benefit provided by the biasing members 54 is a self-standing characteristic when the scooter 10 is stationary or parked such that the handle assembly 32 and front wheel 44 are maintained in a vertical orientation. Overall, the biasing members 54 provides stability to the scooter 10 at low speed as well as at high speed by resisting laterally rolling motion of the support assembly 24.

The biasing members 54 may be configured in a variety of arrangements including, but not limited to, a rubber element or member secured between the support assembly 24 and the trunnion 58 in order to resist relative motion between the rear axle 60 and the support assembly 24. Alternatively, a spring 50 or pair of springs may be inserted between the rear axle 60 and the support assembly 24 in order to resist lateral rolling motion. A spring dampener 52 may be further included with the biasing members 54 in order to reduce the spring 50 rate of the biasing members 54 to further stabilize the scooter 10.

In an alternative embodiment, FIG. 2b illustrates individual mounting of each of the rear wheels 56 by means of a pair of generally vertically-oriented spindles 64. Each of the spindles 64 defines a pivot axis B about which the rear wheels 56 pivot. As can be seen in FIG. 2b, the pair of rear wheels 56 may be interconnected by means of a linkage 66 or tie rod. In this manner, the rear wheels 56 are mechanically coupled to one another such that the rear wheels 56 may yaw in unison about their corresponding pivot axes B.

FIG. 2b further illustrates a control arm secured to each of the spindles 64 for interconnecting the rear wheels 56 by means of linkage 66 or tie rod. At least one of the spindles 64 may include a steering arm (not shown) attached to one of the rear wheels 56. Pivoting motion provided to one of the rear wheels 56 by the control arm is, in turn, transferred to the other one of the rear wheels 56 by means of the linkage 66.

Steering of the scooter 10 may then be effectuated by a foot-actuated or hand-actuated steering mechanism such as a lever (not shown) which induces pivoting motion at the control arm and, which is then transferred to the rear wheels 56.

Referring briefly to FIG. 1, the scooter 10 may further include a suspension system 20 which is operatively coupled to at least one of the front and rear wheels 44, 56. The suspension system 20 is preferably adapted to allow for vertical deflection of the front 44 and/or rear wheels 56 relative to the chassis 18 such as may occur when riding upon uneven terrain or when encountering small obstacles such as gravel, cracks in pavement or expansion joints in sidewalks. The suspension system 20 may include a pair of spring mechanisms such as shock absorbers which may optionally further include a dampener 52 in order to control the rebound rate and dampen oscillations of the spring mechanisms.

As shown in FIG. 1, the suspension system 20 may comprise a shock absorber type of assembly incorporated into each of the down tubes 22 on opposing sides of the front wheel 44. Each of the shock absorbers may terminate at a flange 48 located on each of the down tubes 22. The flange 48 supports hub 46 of the front wheel 44 with the front wheel 44 being rotatable about front wheel axis C. Alternatively, the suspension system 20 may be configured in other arrangements such as, for example, a spring 50 and/or dampener 52 unit incorporated into the vertical arm member 36 located directly above the down tubes 22. It is further contemplated that the rear wheels 56 may include a suspension system 20 between the support assembly 24 and the trunnion 58, for example, in order to allow for vertical deflection of the rear wheels 56 relative to the chassis 18 such as may occur when the rear wheels 56 encounter uneven terrain.

Figure 4:
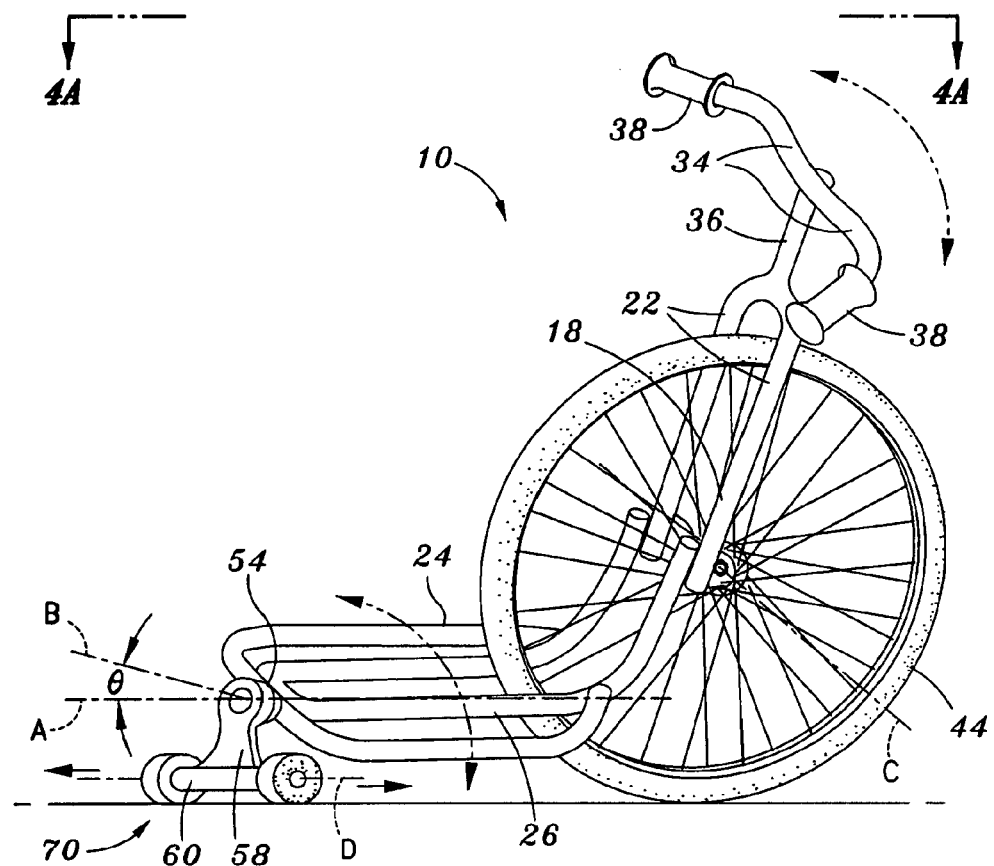
FIG. 4 is a side view of the scooter illustrating a rider inducing a lateral rolling motion to the chassis to effectuate angular yawing of the rear wheels.

Referring to FIG. 4, shown is the scooter 10 with the handle assembly 32 wherein the operator 16 may grasp at least one or both of the lateral arm members 34 for stabilization during straight and level riding as well as during performance of turning maneuvers. Each of the arm members 34 may be provided with a gripping portion 38 in order to facilitate secure grasping by the operator's hands.

Although handle assembly 32 appears similar to conventional handlebars, it should be emphasized that the front wheel 44 is non-pivotally secured to the chassis 18 and therefore provides no steering capability as conventionally exists in a bicycle. In this regard, steering of the scooter 10 is effectuated primarily and solely by angular yawing of the rear wheels 56 in response to lateral rolling of the support assembly 24 as a result of weight shifting and/or as a result of lateral motion of the handle assembly 32 from side-to-side. The handle assembly 32 are preferably located at a height suitable for convenient grasping by the operator 16 in the standing or sitting position. It is contemplated that a height adjustment feature may be included in the handle assembly 32 in order to accommodate riders of different sizes. Furthermore, the lateral extending arm members 34 may be provided in an interchangeable configuration in order to allow mounting of handle assemblies of differing widths, shapes and/or angular orientation.

Referring briefly to FIGS. 1 and 2, the scooter 10 may further include a seat or perch 72 supported by a perch post 74 which may extend laterally aftwardly from an upper portion of the handle assembly 32. The perch 72 is preferably mounted on the perch post 74 at a height which is suitable for straddling or mounting by the operator 16 such that the rider's knees are slightly bent. Optionally, the perch 72 may be configured to be height-adjustable to suit operators 16 of different height. Furthermore, the perch 72 is preferably adapted to be pivotally connected to the handle assembly 32 such that the perch post 74 may be folded generally parallel to the handle assembly 32. When folded the perch post 74 minimizes the total volume occupied by the scooter 10 to facilitate shipping and storage of the scooter 10.

To facilitate pivoting of the perch post 74, the scooter 10 may further include a slotted brace 76 having a slot with a detent at one end thereof and which is configured to engage a pin mounted to the support assembly 24, as shown in FIG. 2. In this manner, upward pivoting of the perch post 74 is facilitated by first disengaging the detent from the pin such that the pin may slide through the slot as the perch post 74 is pivoted upwardly.

Referring briefly to FIG. 7, in a further embodiment of the scooter 10, the chassis 18 is shown having an articulated joint 30 interposed between the support assembly 24 and handle assembly 32 at a forward lower end of the chassis 18. The articulated joint 30 is configured to torsionally couple the horizontally oriented support assembly 24 with the vertically oriented handle assembly 32. In this regard, the articulated joint 30 is configured to allow for lateral rolling motion of the support assembly 24 in a direction opposite that of the handle assembly 32.

The articulated joint 30 provides a means by which the operator 16 may propel the bicycle skateboard by laterally rolling the foot support 26 (i.e., due to asymmetric loading thereof) out-of-phase with the handle assembly 32. Propulsive force may thereby be generated which then translates into forward motion of the scooter 10. The articulated joint 30 may further include a biasing means such as a coil spring 50 and/or dampening means in order to bias the support assembly 24 and handle assembly 32 into neutral alignment and which facilitates the out-of-phase motion of the support assembly 24 relative to the handle assembly 32. Such an arrangement also provides a self-steering characteristic to the scooter 10 as well as a self-standing feature during periods of non-use of the scooter 10. The biasing means further provides rolling resistance to the support assembly 24 relative to the handle assembly 32 and thereby stabilize the scooter 10 at low speeds.

Referring still to FIG. 7, the perch 72 may be supported in an alternative arrangement wherein the perch post 74 extends vertically upwardly from the foot support 26 in order to allow for seated operation of the scooter 10. A pair of braces 76 may extend upwardly from the foot support 26 to increase the load-carrying capability of the perch post 74 under the weight of the operator 16 seated on the perch 72. The foot support 26 is preferably configured to provide sufficient area for placement of the operator's feet when seated on the perch 72.

Referring briefly to FIG. 2, the scooter 10 may optionally include a motor 82 drivingly coupled to at least one of the front and rear wheels 44, 56. The motor 82 is configured to impart rotational motion to the front and/or rear wheels 44, 56 in order to propel the scooter 10. The motor 82 may be configured as an electric motor 82 and may be operatively coupled to the rear wheels 56 such as by means of a motor shaft connected to the rear axle 60. Power for the motor 82 may be provided by means of a power source 84 such as a battery which, in conjunction with the motor 82, may be mounted below the foot support 26 such as that shown in FIG. 2. Preferably, the motor 82 and/or power source 84 are mounted in such a manner so as to provide sufficient ground clearance to accommodate lateral rolling motion of the support assembly 24 during steering of the scooter 10.

Regulation of the motor 82 may be facilitated through the use of a throttle 40 which may be mounted on the handle assembly 32 as shown in FIGS. 2, 4, and 5. Braking or slowing of the scooter 10 may be facilitated through the use of a brake mechanism such as a disc brake or rim brakes operated via a brake lever 42 also mounted on at least one of opposing lateral arm members 34 as shown in FIGS. 2, 4 and 5.

Referring to FIGS. 1-4, the general configuration of the chassis 18 includes the horizontally-oriented support assembly 24 which forms the support surface upon which the operator 16 may stand and to which the rear wheels 56 are pivotally mounted. In an embodiment shown in FIG. 3, the foot support 26 may be comprised of an arrangement of structural elements such as tubular members which are configured to provide sufficient surface area for supporting both of the rider's feet.

Regarding the geometric relationship of the various components of the scooter 10, the front wheel 44 is preferably a pneumatic wheel of relatively large diameter (e.g., 12 inch-28 inch) and preferably having a tire tread of a width generally less than about 2 inches although wider tires are contemplated. The cross sectional geometry of the tire tread itself is preferably radiused to facilitate lateral rolling motion of the front wheel 44. The diameter of the front wheel 44 is preferably between about 6-10 times the diameter of the rear wheels 56. The rear wheels 56 each preferably have a width generally equal to the diameter of the rear wheels 56 although various other width/diameter ratios are contemplated. The rear wheels 56 also preferably have a generally flat or planar tread surface in order to maximize lateral traction during turning.

As was indicated earlier, steering of the scooter 10 is facilitated by angular yawing of the rear wheels 56 in response to asymmetric loading or weighting of the support assembly 24 by the operator 16. By exerting uneven loading on the foot support 26, lateral rolling motion of the support assembly 24 and handle assembly 32 to which the front wheel 44 is connected results in angular yawing or turning of the rear wheels 56. The greater the amount of lateral rolling of the chassis 18 or support assembly 24, the greater the angular yawing movement at the rear wheels 56 which results in a relatively tighter turning radius of the scooter 10.

Because the collective area of the contact patch of the rear wheels 56 are greater than the contact patch at the front wheel 44, steering of the scooter 10 is achieved primarily as a result of angular yawing or turning displacement of the rear wheels 56 in relation to the longitudinal axis A. Traction of the rear wheels 56 may be maximized by optimizing the degree of compliancy of the rear wheels 56 relative to the amount of lateral roll of the support assembly 24. In this manner, the rear wheels 56 can remain in contact with the ground during steering of the scooter 10 regardless of the yaw angle of the rear wheels 56.

The scooter 10 may further be provided with additional accessories or features. For example, as shown in FIGS. 1 and 2, a fender 80 may be included for preventing contact of the operator 16 with the front wheel 44. As can be seen, the fender 80 may be mounted to the down tubes 22 of the handle assembly 32. Likewise, small fenders 80 may be provided over each of the rear wheels 56 in order to prevent inadvertent contact with the rider's foot. Wheelie bars may optionally be included with the scooter 10 whereby the wheelie bars may be extended aftwardly from the rear of the support assembly 24 in order to prevent over-rotation or flipping of the scooter 10. Foot pegs may optionally be disposed at or below the front axle of the front wheel 44. Likewise, floorboards, baskets, bags and/or training wheels may further be included with the scooter 10. In addition, lighting fixtures such as forward headlights and aft tail lights may be included with the scooter 10 as a safety feature or to enable operation during reduced visibility conditions.

In operation, the scooter 10 may be propelled in a forward direction by a variety of different modes including the operator 16 simply pushing in an aftward direction such as with the operator's foot. As was earlier described, the scooter 10 may further be propelled in a forward direction by laterally rolling the front wheel 44 out-of-phase with lateral rolling of the support assembly 24. Energy generated during such out-of-phase motion facilitates forward propulsion of the scooter 10. Forward propulsion of the scooter 10 may further be provided by an electric motor 82 imparting rotational motion to at least one of the front and/or rear wheels 44, 56. Regulation of the motor 82 may be facilitated by a throttle 40 which may be mounted to the handle assembly 32 as shown in FIG. 5. Slowing or stopping of the scooter 10 may be facilitated by a brake mechanism which may be regulated via a brake lever 42 which may be mounted on the handle assembly 32 as shown in FIG. 5.

The above description is given by way of example and not limitation. Given the above disclosure, one skilled in the art could devise variations that are within the scope and spirit of the invention disclosed herein. Furthermore, the various features of the embodiments disclosed herein can be used alone or in varying combinations with each other and are not intended to be limited to the specific combinations described herein. Thus, the scope of the claims is not to be limited by the illustrated embodiments.

What is claimed is:

1. A three-wheeled scooter, comprising;
    a chassis having forward and aft ends and defining a longitudinal axis, the chassis including a support assembly;
    a front wheel non-pivotally mounted to the forward end; and
    a pair of rear wheels coaxially mounted to the aft end and being yawable relative to the longitudinal axis between a neutral position and a yawed position;
    wherein:
        steering of the scooter is effectuated by angular yawing of the rear wheels relative to the longitudinal axis.

2. The scooter of claim 1 wherein the support assembly is configured such that lateral rolling thereof effectuates angular yawing of the rear wheels.

3. The scooter of claim 1 further including a handle assembly rigidly connected to the support assembly such that lateral movement of the handle assembly facilitates yawing of the rear wheels.

4. The scooter of claim 1 further including:
    a trunnion comprising a rear axle and a pivot shaft extending outwardly from the rear axle, the pivot shaft pivotally interconnecting the rear axle to the support assembly;
    wherein:
        the rear wheels are mounted on opposing ends of the rear axle;
        the pivot shaft being oriented such that pivoting of the rear axle thereabout causes yawing of the rear wheels relative to the longitudinal axis.

5. The scooter of claim 4 wherein the trunnion is configured such that the yawing capability of the rear axle relative to the longitudinal axis is a half-angle of at least about 45 degrees.

6. The scooter of claim 4 wherein the pivot shaft defines a pivot axis being inclined relative to the longitudinal axis.

7. The scooter of claim 6 wherein the pivot axis is oriented downwardly along a direction from the aft end toward the forward end.

8. The scooter of claim 6 wherein:
    the chassis includes a handle assembly and having an articulated joint interconnecting the support assembly to the handle assembly;

the articulated joint being configured to allow lateral rolling of the support assembly relative to the handle assembly.

9. The scooter of claim 4 further including a biasing member operatively connected to the trunnion and being configured to bias the rear axle toward the neutral position.

10. The scooter of claim 1 wherein:
each of the rear wheels is independently pivotally mounted to the support assembly;
the rear wheels being mechanically coupled to one another to angularly yaw in unison.

11. The scooter of claim 10 further including:
a pair of spindles and a linkage;
wherein:
each one of the spindles is configured to pivotally mount a corresponding one of the rear wheels to the support assembly;
the linkage being configured to mechanically couple the rear wheels.

12. The scooter of claim 1 wherein the front wheel diameter is between about six to ten times the rear wheel diameter.

13. The scooter of claim 1 wherein the support assembly includes a foot support for supporting an operator standing thereupon.

14. The scooter of claim 1 wherein the chassis further includes a perch portion extending laterally outwardly from the chassis and being configured to support an operator sitting thereupon.

15. The scooter of claim 14 wherein the perch portion is configured to be pivotally foldable generally parallel to the handle assembly.

16. The scooter of claim 1 further including a motor drivingly coupled to at least one of the front and rear wheels and being configured to impart rotational motion thereto for propelling the scooter.

17. The scooter of claim 1 further including a suspension system operatively coupled to at least one of the front and rear wheels and being configured to allow for vertical deflection thereof relative to the chassis.

18. The scooter of claim 1 wherein the chassis includes a handle assembly located forward of and extending upwardly from the support assembly and having a vertical arm member for gripping by an operator.

19. The scooter of claim 18 wherein the handle assembly further includes a pair of opposing lateral arm members extending outwardly from the vertical arm member for gripping by the operator.

* * * * *